United States Patent [19]

Northrup, Jr.

[11] 4,180,985
[45] Jan. 1, 1980

[54] AIR CONDITIONING SYSTEM WITH REGENERATABLE DESICCANT BED

[75] Inventor: Lynn L. Northrup, Jr., Dallas, Tex.

[73] Assignee: Northrup, Incorporated, Hutchins, Tex.

[21] Appl. No.: 856,400

[22] Filed: Dec. 1, 1977

[51] Int. Cl.² .................. F25D 17/06; F25D 23/00
[52] U.S. Cl. ................................. 62/94; 62/271
[58] Field of Search ........................... 62/94, 271

[56] References Cited

U.S. PATENT DOCUMENTS

| | | | |
|---|---|---|---|
| 1,863,579 | 6/1932 | Morse et al. | 62/94 |
| 2,085,964 | 7/1937 | Fonda | 62/94 |
| 2,115,226 | 4/1938 | Kopp | 62/271 |
| 2,183,136 | 12/1939 | Downs | 62/94 |
| 2,946,201 | 7/1960 | Munters | 62/271 |
| 3,144,901 | 8/1964 | Meek | 62/94 |
| 3,965,695 | 6/1976 | Rush et al. | 62/271 |
| 4,060,913 | 12/1977 | Yoshida et al. | 62/271 |

*Primary Examiner*—Lloyd L. King
*Attorney, Agent, or Firm*—Hubbard, Thurman, Turner & Glaser

[57] ABSTRACT

An improved method and apparatus for air conditioning, using a refrigeration system, are disclosed. The disclosed method and apparatus provide for a refrigeration type air conditioning system to be equipped with a regeneratable desiccant for contacting moist feed air prior to passing the feed air across evaporator coils of the system. The desiccant removes a substantial portion of moisture from the feed air, thereby improving the efficiency of the air conditioning system. The desiccant material is regenerated by utilizing waste heat that is removed from the condenser of the air conditioning system.

19 Claims, 3 Drawing Figures

AIR CONDITIONING SYSTEM WITH REGENERATABLE DESICCANT BED

BACKGROUND OF THE INVENTION

This invention relates to an improved air conditioning method and apparatus. In another aspect, this invention relates to an improved air conditioning method and apparatus wherein moisture can be removed from air to be cooled without codensing such moisture. In still another aspect, this invention relates to an improved air conditioning method and apparatus wherein waste heat from the system is used to improve the overall efficiency of the system.

Within the past few years, the use of air conditioning systems for controlling the temperature of air in various types of structures has increased dramatically. In some areas of the country, virtually all types of new construction of homes, office buildings and factories include air conditioning systems to improve the overall comfort of the occupants. The most widely used types of air conditioning systems are systems that utilize a refrigeration cycle wherein a refrigerant is alternately compressed and vaporized. Upon compression of the gaseous refrigerant, a considerable amount of waste heat can be removed from the system by passing air or any other fluid across the condenser of the system. Likewise, a considerable amount of heat can be removed from air which is passed across the evaporator portion of the apparatus.

A considerable amount of energy is required to operate a refrigeration cycle air conditioning system.

Recent economic and political developments have resulted in a dramatic increase in the cost of energy. Because of such increased cost and, as the result of very real and potential shortages of conventional energy sources, various approaches toward conserving and reducing energy consumption have been investigated. Due to the fact that refrigeration cycle air conditioning systems use such vast quantities of energy, it is apparent that methods and apparatus for improving the efficiency of refrigeration cycle air conditioning systems are needed.

SUMMARY OF THE INVENTION

Accordingly, it is an object of this invention to provide improved air conditioning methods and apparatus. It is another object of this invention to provide improved air conditioning methods and apparatus wherein the overall efficiency of refrigeration cycle air conditioning systems can be improved. It is still a further object of this invention to provide new and improved air conditioning methods and apparatus wherein waste heat from the system can be used in a beneficial manner. It is yet a further object of this invention to provide an improved air conditioning method and apparatus that utilizes a novel approach for dehumidification of air.

Other aspects, objects and advantages of this invention will be apparent to those skilled in the art from the following disclosure and appended claims.

In the instant invention, a refrigeration cycle air conditioning system utilizes a conventional compressor, evaporator and condenser in conjunction with a unique dehumidification system. The dehumidification system utilized in the invention is a system wherein air is dehumidified prior to passing the air across the evaporator coils of the system. The dehumidification is carried out by contacting the moist feed air with a desiccant material in such a manner that a substantial amount of the water vapor in the feed air is removed from the feed air by the desiccant material. Following such contact, the thus treated air is passed across evaporator coils of the air conditioning system. As the desiccant material becomes at least partially saturated with moisture that is removed from the feed air, the desiccant material can then be regenerated with heat energy that is removed from the air conditioning system through the condenser portion of the system. The heat energy that is utilized to regenerate the desiccant material is that energy that is normally referred to as "waste heat", since it is normally exhausted into the atmosphere. The instant invention provides for a continuous operation wherein a portion of the desiccant material is removing moisture from feed air, prior to the feed air being passed across the evaporator coils, while the remaining portion of the desiccant material is being regenerated with waste heat that is removed from the system in the condenser section of the system.

DESCRIPTION OF PREFERRED EMBODIMENTS

Figure 1:
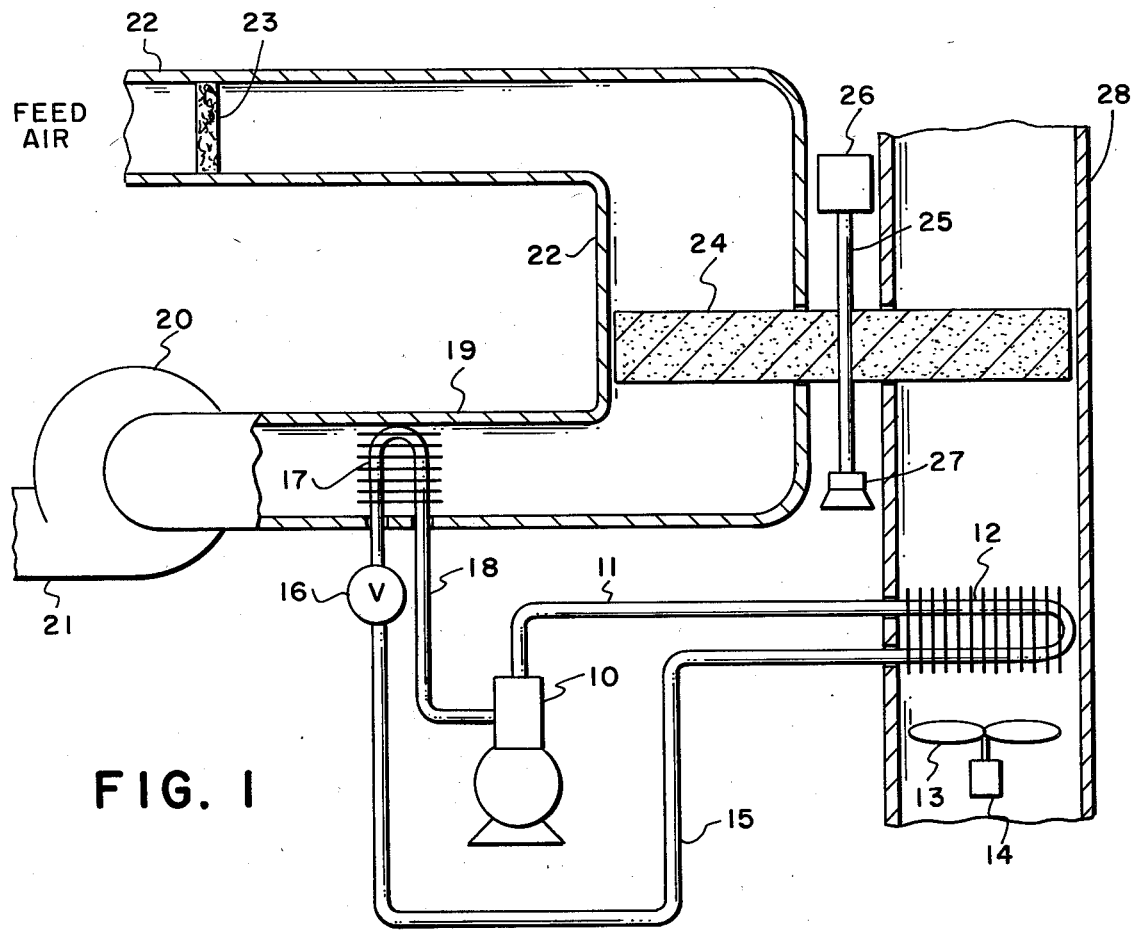
FIG. 1 is a schematic drawing showing the arrangement of various pieces of equipment utilized in the instant invention.

The preferred embodiments of this invention can best be described by referring to the drawings. FIG. 1 is a schematic drawing that shows the arrangement of various pieces of equipment utilizing one preferred dehumidification apparatus. FIG. 1 illustrates an air conditioning system that can be utilized to control temperature and humidity conditions in a habitable structure such as a home, office building, factory and the like. Compressor 10 is utilized to compress a vaporizable refrigerant material such as Freon refrigerant, ammonia refrigerant and the like. As the compressed refrigerant is discharged from compressor 10 through discharge conduit 11, the high pressure fluid will be in a heated state, due to the compression. The high temperature refrigerant is then passed through condenser coils 12 wherein a heat exchange occurs between the high temperature compressed refrigerant and relatively cooler air that is directed across condenser coils 12 by means of fan 13 which is propelled by suitable means such as electric motor 14. As the heat exchange occurs, the heated compressed refrigerant will at least partially condense as the temperature of the gas is lowered. Thus, as the refrigerant leaves condenser coils 12, at least a portion of it will normally be in a liquid state. The thus condensed refrigerant is removed from condenser coils 12 by means of transfer conduit 15 and is passed to expansion valve 16. As the refrigerant passes through expansion valve 16, the pressure is substantially lowered and the refrigerant will begin to vaporize as it passes through evaporator coil 17. The vaporization, of course, will cause a substantial temperature drop by virtue of the heat of vaporization of the refrigerant. Air that is passed over the outer surfaces of the evaporator coils undergoes heat exchange with the cold refrigerant and the temperature of the air will be substantially lowered. The at least partially vaporized refrigerant is removed from evaporator coil 17 by means of return conduit 18. The suction side of compressor 10 is connected to return conduit 18.

Evaporator coils 17 are disposed in duct 19. Air is moved across evaporator coils 17 by means of blower 20 whereby the suction side of blower 20 pulls air across evaporator coil 17 and discharges the cooled air through discharge duct 21. Discharge duct 21 can be utilized to direct the thus cooled air into a duct system for distribution throughout a structure, as desired.

In the preferred embodiment of the instant invention, the air passing through duct 19 is dehumidified prior to the air being passed across evaporator coils 17. The dehumidification occurs by passing feed air through feed duct 22, through filter means 23, if desired, and then into contact with desiccant means 24. Normally, feed air being passed through feed circuit 22 will be relatively moist air. The feed air can be fresh, outside air or it can be return air from the structure being cooled.

While it is preferred in most instances to dehumidify air by contacting it with the desiccant means prior to passing the air into contact with the evaporator coils, it is also within the scope of the invention to dehumidify air that has previously been cooled by contacting the air with the desiccant downstream of the evaporator.

Dessicant means 24 can be any suitable type of desiccant material that is capable of removing moisture from the feed air and which can be regenerated by using heat energy recovered from the condenser section of the air conditioning system. Useful desiccant materials include solids such as silica gel, activated alumina, bauxite molecular sieves and the like. It is also within the scope of the present invention to use liquid desiccant materials such as glycerine, various glycols, concentrated acids, aqueous solutions of various salts and the like. When liquid desiccants are utilized, it is preferred that such liquids be at least partially miscible in water and readily regeneratable. Especially preferred liquid desiccants include glycols such as triethylene glycol, diethylene glycol, glycerol and the like. It will be appreciated that mixtures of desiccants are useful in this invention. One particularly preferred type of liquid desiccant material is Hygrol, a trademark used by the Niagara Blower Company to describe a glycol based liquid desiccant.

As feed air passes through the desiccant means 24, moisture will be removed and the thus dehumidified air can thereafter be passed across evaporator coils 17. By the removal of the moisture from the feed air, the amount of sensible heat removed from the feed air per given volume will be substantially increased as opposed to the same given volume of moist feed air. As is known to those skilled in the art, when moist feed air is passed across evaporator coils 17, a substantial amount of the energy utilized in the air conditioning is energy that is used to condense water that is contained in the feed air. In some instances, when relative humidity levels are high, as much as about twenty-five percent and more of the total energy utilized in the air conditioning system will be energy that is utilized to condense water from the feed air. In other words, only about seventy-five percent or less of the total energy utilized will be energy utilized to lower the sensible heat of the feed air as it passes across evaporator coils 17.

The desiccant material that is utilized to remove water from the feed air prior to the feed air being passed across evaporator coils 17, can be contained within any suitable container that will allow an intimate contact of the feed air with the desiccant material. For example, the desiccant material can be contained in beds or it can be supported by any suitable type of support structure such as a fibrous support structure, screens, grids, wheels and the like. In those instances where a liquid desiccant is utilized, the desiccant may be sprayed into the air stream to be dehumidified or it may be utilized to wet or otherwise coat surfaces of pads, screens, belts, beds of particulate materials and the like, to allow intimate contact of the air to be dehydrated with the liquid desiccant. As the desiccant material becomes at least partially saturated with water, the effectiveness in the removal of water from the incoming feed air is, of course, reduced. To regenerate the desiccant material, at least a portion of the desiccant material is removed from contact with the incoming feed air and is then passed to a zone wherein heat energy that is removed from condenser coils 12 is utilized to regenerate the desiccant material.

As shown in FIG. 1, desiccant material 24 can be mounted in a cylindrical bed which is rotatably supported by desiccant bed shaft 25. Desiccant bed shaft 25 is operably connected to motor means 26 whereby motor means 26 can cause rotation of the desiccant bed about its axis with shaft 25 extending through said axis. The lower end of desiccant bed shaft 25 can be supported by bearing means 27 to allow the shaft to rotate in response to the action of motor means 26. As shown in FIG. 1, a portion of the desiccant bed on one side of shaft 25 extends into feed duct 22 and the portion of the desiccant bed on the other side of shaft 25 extends into regenerator duct 28. Regenerator duct 28 is a duct means that allows heated air to pass across condenser coils 12 and then into contact with the portion of the desiccant bed extending into regenerator duct 28. It will be appreciated that apertures are formed in the walls of duct 22 and regenerator duct 28 to allow the cylindrical desiccant bed to rotate with portions of the desiccant bed extending into the interior of duct 22 and regenerator duct 28. The cylindrical desiccant bed or "desiccant wheel" can be rotated as desired to allow portions of the desiccant material to be alternately contacting feed air passing through duct 22 and heated air passing through regenerator duct 27. As illustrated, fan 13 directs air upwardly through and across relatively hot condenser coils 12 where the air is heated and then such heated air passes upwardly through regenerator duct 27 through that portion of desiccant bed 24 that is then extending into the interior of regenerator duct 28. As the hot air passes through the dessicant material in the interior of regenerator duct 28, water is removed from the desiccant material and passes outwardly through the upper discharge end of regenerator duct 28. With the removal of the water by virtue of the passage of the heated air through the desiccant bed, the desiccant material will be regenerated.

The apparatus shown in FIG. 1 can be operated in such a manner that motor means 26 is periodically activated to thereby cause a rotation of the desiccant bed to allow regenerated desiccant to be reintroduced into the interior of duct 22 and allow the substantially saturated desiccant material to be introduced into the interior or regenerator duct 28. If desired, motor means 26 can be adapted to run continously whereby the desiccant bed will slowly be rotated on a continuous basis.

It will be appreciated that FIG. 1 is a schematic illustration of only one of the preferred embodiments of this invention. Various other equipment, such as additional filters, additional bearings to support shaft 25 and the desiccant bed will also be incorporated into the apparatus.

While the apparatus of FIG. 1 is especially useful for containing solid desiccant materials in a bed, the apparatus is also useful for containing a solid particulate material or fibrous material that is coated with or wetted with a suitable liquid desiccant material.

Since the desiccant bed, as illustrated in FIG. 1, will be a desiccant bed that will rotate the desiccant material through feed duct 22 and regenerator duct 28, suitable means will be incorporated into the duct walls to insure a relatively tight air seal to prevent excessive leakage of air into or out of ducts. Any suitable seal means can be utilized, such as flexible rubber flaps that are disposed within the walls of the ducts to contact the outer surfaces of the desiccant wheel are especially useful. Other types of seals may also be used.

Figure 2:
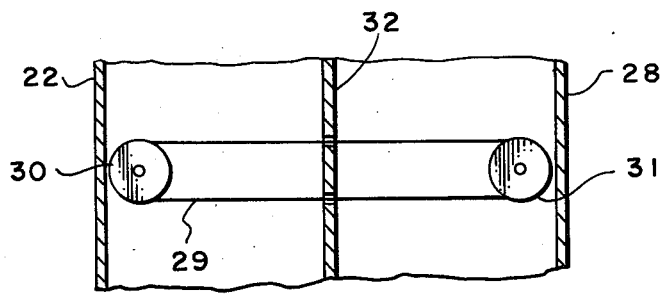
FIG. 2 is a schematic drawing showing an alternate apparatus for dehumidifying feed air and for regenerating a desiccant used in the dehumidification process.

FIG. 2 represents another preferred embodiment of this invention wherein the desiccant material is carried by a continuous belt. In FIG. 2, continuous belt 29 is supported by pulley means 30 in the interior of feed duct 22 and by means of pulley means 31 in the interior of regenerator duct 28. Partitioning wall 32 divides and separates feed duct 22 from regenerator duct 27. If desired, partitioning wall 32 can be insulated to reduce the amount of heat transfer between the two ducts. Continuous belt 29 passes through partitioning wall 32 with suitable seal means contacting the surfaces of belt 29 to prevent leakage of air between the two duct means. The continuous belt can be rotated by operably connecting at least one of pulley means 30 and 31 to a suitable drive system, such as an electric motor. As described above, for the apparatus in FIG. 1, continuous belt 29 can be intermittently rotated or it can be continuously rotated whereby desiccant material will be continuously moving through the feed duct and the regenerator duct to continuously regenerate the spent desiccant and to continuously introduce regenerated desiccant material into the feed duct. The belt structure will preferably be a sieve-like or open mesh material that will allow the desiccant to be supported thereon and to allow air to freely pass through or into contact with such desiccant material. The belt structure is useful for supporting either solid or liquid desiccant materials.

Figure 3:
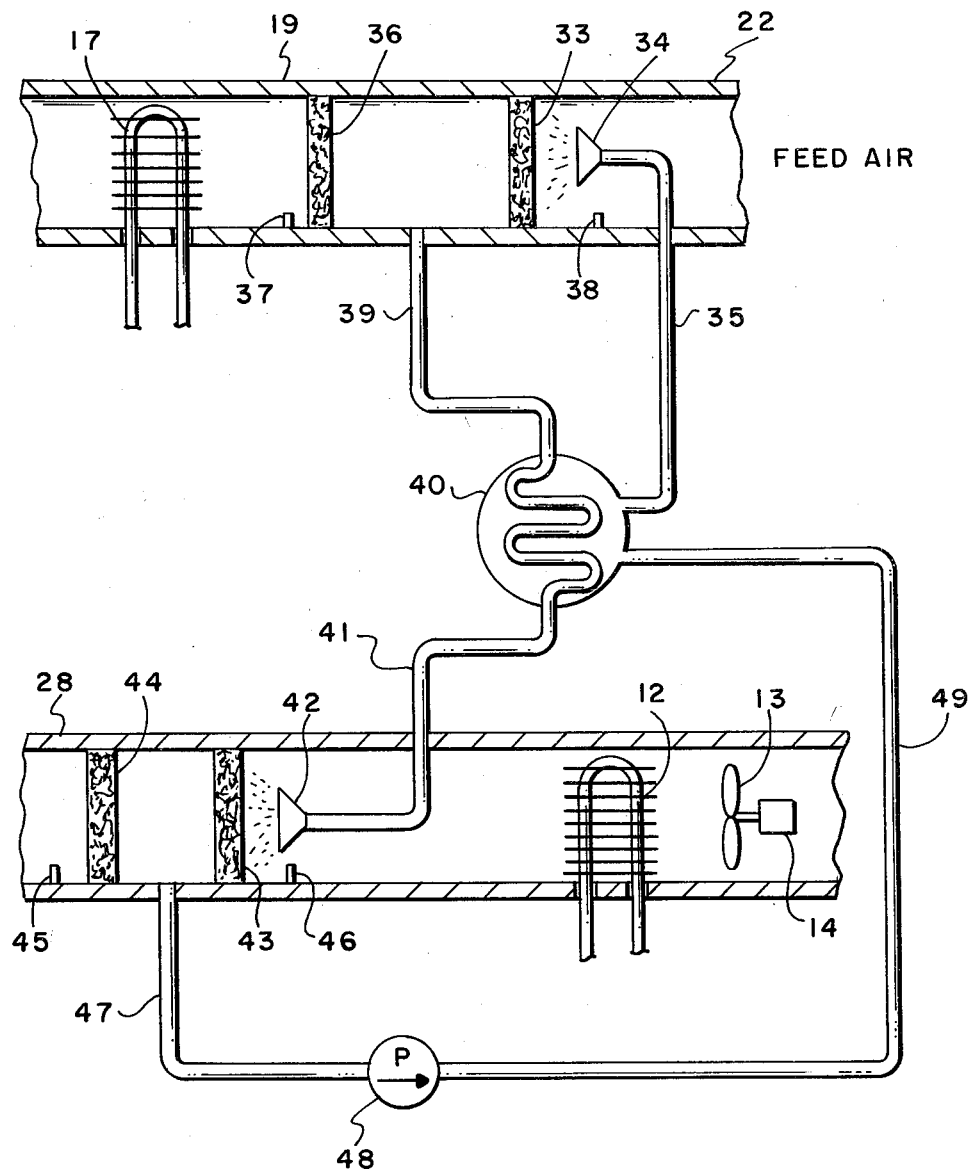
FIG. 3 is a schematic drawing showing yet another alternate apparatus for dehumidifying feed air and for regenerating a liquid desiccant used in the dehumidification process.

FIG. 3 represents another preferred embodiment of this invention wherein a liquid desiccant material is utilized. In FIG. 3, moist feed air is supplied to the system through feed duct 22. Disposed within feed duct 22 is desiccant pad 33. Desiccant pad 33 can be any suitable material that can be disposed and supported within feed duct 22 to allow the moist feed air to flow through the pad and contact the liquid desiccant material with a negligible pressure drop across the pad. Materials such as fiberglass pads, wire screens, packed steel shavings and the like, can be utilized for constructing desiccant pad 33. Feed nozzle 34 is disposed upstream of desiccant pad 33 and is oriented in such a manner that liquid desiccant material can be sprayed across the surfaces of desiccant pad 33 to provide a large surface area for the moist feed air to contact the liquid desiccant material. If desired, a suitable feed conduit can be disposed along the upper portions of desiccant pad 33 with suitable apertures to allow the liquid desiccant material to trickle down and flow downwardly and across the surfaces of desiccant pad 33.

Liquid desiccant material is supplied to feed nozzle 34 through liquid feed conduit 35. Thus, as the moist feed air flows through desiccant pad 33, the liquid desiccant material will remove substantial portions of the moisture contained within the feed air. As the liquid desiccant material picks up the moisture from the feed air, the at least partially saturated liquid desiccant material will flow downwardly and can be collected for subsequent regeneration as hereinafter described.

If desired, mist eliminator 36 can be disposed downstream of desiccant pad 33 in order to remove entrained droplets of the liquid desiccant material. Mist eliminator 36 can be any suitable type of mist eliminator such as a fibrous pad, wire or fiber screens, baffles and the like. The thus dehydrated air is then passed through duct 19 with evaporator coil 17 disposed therein for the desired heat exchange, as described above.

Any suitable means for removing the at least partially saturated liquid desiccant material for subsequent regeneration can be utilized. One simple but effective method for removing the at least partially saturated liquid desiccant material is illustrated in FIG. 3 wherein divider members 37 and 38 are positioned in the lower portions of duct members 19 and 22 to thereby form small liquid dams to contain the liquid desiccant material between such divider members. Drain conduit 39 is in open communication with the portion of the air duct between divider members 37 and 38 to allow the liquid desiccant material to drain from the air duct and to be removed for subsequent regeneration.

In a preferred embodiment of this invention, at least partially saturated liquid desiccant material is removed from the air duct system through drain conduit 39 and passed to heat exchanger 40. As will be described hereinafter, the at least partially saturated liquid desiccant will be passed in heat exchange relationship with regenerated liquid desiccant to effect a desired transfer of heat. Following passage of the at least partially saturated liquid desiccant through heat exchanger 40, the liquid desiccant material is directed through conduit 41 to regenerator feed nozzle 42 which is disposed in regenerator duct 28. Regenerator nozzle 42 is oriented so as to allow the at least partially saturated liquid desiccant material to be sprayed or spread across the surfaces of regenerator pad 43 which is also disposed within regenerator duct 28. Regenerator pad 43 is similar to desiccant pad 33 in that it is a structure, such as a fiber structure, that allows the liquid desiccant material to be spread evenly across its surfaces to thereby create a large liquid surface area through which or over which air can be passed.

As described above, with reference to FIGS. 1 and 2, condenser coil 12 is disposed within regenerator duct 28 and air is directed across condenser coil 12 by means of fan 13 which is propelled by motor means 14. Thus, as the air is directed across condenser coil 12, it is heated and is thereafter passed through regenerator pad 43. The heated air thereby removes moisture from the liquid desiccant material, thus regenerating the liquid desiccant material as it contacts the hot air. If desired, regenerator mist eliminator 44 can be disposed downstream of regenerator pad 43 to trap or remove entrained droplets of the regenerated liquid desiccant material.

Any suitable means for removing the thus regenerated liquid desiccant material from regenerator duct 28 can be utilized. One simple and effective means for removing the regenerated liquid desiccant material from regenerator duct 28 is by the use of divider members 45 and 46 which are disposed in the lower portions of regenerator duct 28. Divider members 45 and 46 are oriented in such a manner as to form liquid barriers or small liquids dikes to contain the regenerated liquid desiccant material between such divider members. Regenerator drain conduit 47 is in open communication with the area between divider members 45 and 46 whereby the regenerated liquid desiccant material can flow by gravity downwardly through regenerator drain conduit 47. Pump means 48 can be installed in regenerator drain conduit 47 in such a manner that the regenerated liquid desiccant material is thereafter pumped back through heat exchanger 40 by means of return conduit 49.

Since the regenerated liquid desiccant material taken from the regenerator section will be at an elevated temperature because of its contact with the heated air in the regenerator section, it is preferred to pass the heated regenerated desiccant material in heat exchange relationship with the relatively cool at least partially saturated liquid desiccant material that is being sent to the regenerator for regeneration. Such a heat exchange between the partially saturated liquid desiccant and the regenerated desiccant improves the overall efficiency of the system. Following the heat exchange in heat exchanger 40, the thus cooled regenerated liquid desiccant material is passed through feed conduit 35 back to feed nozzle 34 wherein the process is repeated.

It will be appreciated that the use of liquid desiccant materials may, in some instances, have several advantages over the use of solid type desiccant materials, especially in the transport of the desiccant materials from one zone to another. It, of course, will be appreciated that by using equipment similar to that illustrated in FIG. 3, it is not necessary to have large solid transport equipment such as belts, moving beds and the like, for transferring the liquid desiccant materials. Another advantage of using liquid desiccant materials may be in the ease of sealing the various air ducts to prevent undesired air leakage around large moving beds, belts and the like. In some instances, it may be desirable to have the regenerator section of the system removed a considerable distance from the portion of the system removing moisture from feed air. When such displacement of the regenerator occurs, it is sometimes more convenient to use the liquid desiccant material since it is usually easier and more economical to transport liquids than it is to transport solids over long distances. It, of course, will also be appreciated that other types of equipment, such as liquid wicks and the like, can be utilized for contacting the moist feed air with the liquid desiccant material and for regenerating the at least partially saturated liquid desiccant material in the regenerator section of the apparatus.

It will be appreciated that in some instances, it may be desirable to add supplemental waste heat to regenerator duct 28 to accomplish the desired regeneration of the spent desiccant material. Supplemental heat addition to the regenerator section usually improves the overall efficiency of the system for removal of water from the desiccant material. Such waste heat can be in the form of hot exhaust gases, flue gases, solar generator heat and the like, which would normally be vented into the atmosphere. The addition of such supplemental heat sources for the regeneration of the desiccant material is optional since sufficient waste heat can be removed from the condenser coils to provide regeneration air streams of up to about 130° F. to thereby accomplish the desired regeneration.

It will be appreciated that the above-described apparatus will allow for substantial improvements in the energy efficiency of air conditioning system. By utilizing the instant invention, it is no longer necessary to expend and use vast quantities of energy simply to dehumidify air that is being cooled. By utilizing the instant invention, the waste heat that is normally vented into the atmosphere is utilized in an effective manner to regenerate desiccant material that has previously carried out the desired dehumidification.

The instant invention improves the efficiency of refrigeration type air conditioning systems considerably since it is no longer necessary to design such systems to remove large amounts of water from moist feed air by means of refrigeration. In accordance with this invention, dehumidification is accomplished by using normally wasted energy from the refrigeration type of air conditioning system. The invention makes it possible to more carefully design such air conditioning systems and equipment whereby the evaporator temperature of the system can be raised. By raising the evaporator temperature of the refrigeration type air conditioning system, a substantial improvement in the overall efficiency or performance of the system is obtained. The net effect of this improvement is shown by comparing a typical compressor supplying a 45° F. evaporator coil which is required for moisture removal and the same compressor supplying a 55° F. evaporator coil for sensible cooling only where the latent work is done by using normally rejected heat to regenerate a desiccant which, in turn, removes the necessary moisture. Such a comparison is shown below:

|  |  | Evaporator 45° | Temperature 55° |
|---|---|---|---|
| Capacity (BTU) | - Sensible | 39,000 | 65,000 |
|  | - Latent | 13,000 | 21,000 |
|  | Total | 52,000 | 86,000 |
| Watt Input |  | 5,550 | 5,800 |
| BTU Input |  | 18,900 | 19,900 |
| Coefficient of Performance |  | 2.75 | 4.38 |

The foregoing example illustrates an improvement in performance of a system operated in accordance with this invention. It will be noted from the above example that the coefficient of performance is increased by 59% when the evaporator temperature is 55° F. as opposed to an evaporator temperature of 45° F.

It should be understood that various changes and modifications may be made in the foregoing description without departing from the spirit and scope of this invention.

The embodiments of the invention in which an exclusive property or privilege is claimed are defined as follows:

1. In a refrigeration type air conditioning system which includes a compressor, an evaporator and a condenser, a vaporizable refrigerant contained within a closed conduit communicating with said compressor, said evaporator and said condenser, the improvement which comprises a regeneratable desiccant material, means to pass a first fluid into contact with said desiccant material to thereby remove at least a portion of the water vapor from said first fluid and to produce a desiccant material at least partially saturated with water, means to thereafter pass the thus treated first fluid into contact with said evaporator, thereby cooling said thus treated first fluid, means to pass a second fluid into contact with said condenser to thereby heat said second fluid and means to contact the thus heated second fluid with at least a portion of the at least partially water saturated desiccant material to thereby at least partially regenerate said desiccant material.

2. The system of claim 1 wherein said means to pass a first fluid into contact with said desiccant material includes a first duct with said desiccant disposed in said first duct, said first duct being in open communication with a second duct with said evaporator being disposed in said second duct and said means to contact said second fluid with said condenser includes a third duct with said condenser being disposed in said third duct.

3. The system of claim 2 wherein said system includes means to move said at least partially water saturated desiccant material from said first duct to said third duct and means to move the at least partially regenerated desiccant material from said third duct to said first duct.

4. The system of claim 3 wherein said means to move said at least partially water saturated desiccant material and said means to move said at least partially regenerated desiccant material include a desiccant bed supported in a rotating bed and means to rotate said bed with said rotating bed being adapted to rotate with said at least partially water saturated desiccant material being moved from said first duct into said third duct and said at least partially regenerated desiccant material from said third duct to said first duct.

5. The system of claim 4 wherein said desiccant includes alumina.

6. The system of claim 4 wherein said desiccant includes silica gel.

7. The system of claim 3 wherein said means to move said at least partially water saturated desiccant material and said means to move said at least partially regenerated desiccant material include an endless belt with said desiccant material supported by said endless belt and means to rotate said belt.

8. The system of claim 7 wherein said desiccant material includes alumina.

9. The system of claim 7 wherein said desiccant material includes silica gel.

10. The system of claim 3 wherein said desiccant material is a liquid desiccant.

11. The system of claim 10 wherein said at least partially saturated desiccant material is passed in heat exchange relationship with said at least partially regenerated desiccant material.

12. The sytem of claim 10 wherein said desiccant material includes a glycol selected from the group consisting of dimethyleglycol and trimethylene glycol.

13. The system of claim 3 wherein additional heating means disposed within said third duct means whereby additional heat is supplied to said second fluid before said second fluid is contacted with said at least partially saturated desiccant material.

14. In a process for air conditioning a structure with a refrigeration type air conditioning system which includes a compressor means, an evaporator means, a condenser means and a vaporizable refrigerant contained within a conduit means communicating with said compressor means, said condenser means and said evaporator means, the improvement comprising passing a first fluid into contact with a regeneratable desiccant means in a first conduit means to remove at least a portion of the water vapor from said first fluid and to produce a desiccant at least partially saturated with water, passing the thus treated first fluid into contact with said evaporator means in a second conduit means, removing at least a portion of said desiccant which is at least partially saturated with water and passing it to a third conduit means, passing a second fluid into contact with said condenser to thereby heat it and thereafter passing the thus heated second fluid into contact with said at least partially saturated water to thereby regenerate said desiccant material and means to return the regenerated desiccant material to said first conduit means.

15. The process of claim 14 wherein said desiccant material is supported in a rotatable bed and said bed is rotated in a manner whereby said first fluid passes through a portion of said bed to contact said desiccant material to at least partially saturate said desiccant and whereby said bed is rotated whereby said at least partially saturated desiccant is contacted with said second fluid to regenerate said desiccant material and returning the thus regenerated desiccant material to said first conduit means.

16. The process of claim 14 wherein said desiccant material is supported on an endless belt and said belt is rotated in a manner whereby said first fluid passes through a portion of said desiccant material to at least partially saturate said desiccant and whereby said belt is rotated whereby said at least partially saturated desiccant is contacted with said second fluid to regenerate said desiccant material and returning the thus regenerated desiccant material to said first conduit means.

17. The process of claim 14 wherein said additional heat is supplied to said third conduit means to heat said second fluid.

18. The process of claim 17 wherein said additional heat is supplied by solar heating.

19. The process of claim 14 wherein said first fluid is passed into contact with a liquid desiccant material to produce a desiccant which is at least partially saturated with water and passing the thus at least partially saturated desiccant material in heat exchange relationship with regenerated desiccant material.

* * * * *